(12) United States Patent
Zheng et al.

(10) Patent No.: US 12,697,195 B2
(45) Date of Patent: Aug. 4, 2026

(54) ORAL IRRIGATOR HAVING WATER SPRAY SWITCHING FUNCTION

(71) Applicant: XIAMEN SOLEX HIGH-TECH INDUSTRIES CO., LTD., Xiamen (CN)

(72) Inventors: Jie Zheng, Xiamen (CN); Shuixiu Xie, Xiamen (CN); Guihua Yan, Xiamen (CN); Tingke Liu, Xiamen (CN); Mingfu Zhang, Xiamen (CN)

(73) Assignee: XIAMEN SOLEX HIGH-TECH INDUSTRIES CO., LTD., Xiamen city (CN)

( * ) Notice: Subject to any disclaimer, the term of this patent is extended or adjusted under 35 U.S.C. 154(b) by 1042 days.

(21) Appl. No.: 17/815,578

(22) Filed: Jul. 28, 2022

(65) Prior Publication Data

US 2023/0036456 A1    Feb. 2, 2023

(30) Foreign Application Priority Data

Jul. 29, 2021    (CN) .......................... 202110865618.4
Sep. 1, 2021    (CN) .......................... 202111022029.6

(51) Int. Cl.
*A61C 17/02* (2006.01)
*B05B 1/12* (2006.01)
(52) U.S. Cl.
CPC ............ *A61C 17/0202* (2013.01); *B05B 1/12* (2013.01)
(58) Field of Classification Search
CPC .. A61C 17/02–028; B05B 1/12; B05B 9/0413
See application file for complete search history.

(56) References Cited

U.S. PATENT DOCUMENTS 3,561,433 A * 2/1971 Kovach .................. A61C 17/02
601/162
3,745,655 A * 7/1973 Malmin ............. A61C 17/0208
433/91

(Continued)

FOREIGN PATENT DOCUMENTS

CN        112403699 A      2/2021
CN        216603134 U      5/2022
(Continued)

OTHER PUBLICATIONS

1st Office Action dated Aug. 1, 2023 of Japanese Application No. 2022-120398.

(Continued)

*Primary Examiner* — Joseph D. Boecker
*Assistant Examiner* — Thomas W Greig
(74) *Attorney, Agent, or Firm* — Qinghong Xu

(57) ABSTRACT

The present disclosure provides an oral irrigator having water spray switching function, which includes a body, a nozzle and a path switching mechanism. The nozzle is provided with a first path and a second path, and the path switching mechanism is configured to communicate one of the first path and the second path with an outlet end of a piston assembly inside the body of the oral irrigator, and disconnect the other one of the first path and the second path from the outlet end of the piston assembly. The nozzle has a water outlet communicating with the first path and the second path. Water sprays from the water outlet are different when the first path or the second path is communicated with the outlet end of the piston assembly inside the body. The oral irrigator of the present disclosure can realize water spray switching without changing the nozzle.

8 Claims, 11 Drawing Sheets

(56) References Cited

U.S. PATENT DOCUMENTS

| | | | | |
|---|---|---|---|---|
| 4,026,025 A * | 5/1977 | Hunt | A61C 17/0217 | 433/80 |
| 4,149,315 A * | 4/1979 | Page, Jr. | A61C 17/0217 | 604/141 |
| 4,671,259 A * | 6/1987 | Kirchner | A61C 17/0202 | 433/80 |
| 4,793,332 A * | 12/1988 | Klein | A61C 17/0202 | 601/163 |
| 4,907,744 A * | 3/1990 | Jousson | A61C 17/0202 | 137/625.48 |
| 5,321,865 A * | 6/1994 | Kaeser | A61C 17/36 | 601/162 |
| 5,500,973 A | 3/1996 | Phelan | | |
| 5,616,028 A * | 4/1997 | Hafele | A61C 17/02 | 433/80 |
| 5,993,402 A * | 11/1999 | Sauer | A61C 17/02 | 601/162 |
| 6,159,006 A * | 12/2000 | Cook | A61C 17/02 | 601/165 |
| 6,245,032 B1 * | 6/2001 | Sauer | B05B 3/0429 | 601/165 |
| 11,013,585 B2 * | 5/2021 | Berkely | A61C 17/022 | |
| 12,115,299 B2 * | 10/2024 | Lazic | A61M 1/7413 | |
| 2010/0152634 A1 * | 6/2010 | Dove | A61C 17/0202 | 601/162 |
| 2012/0021374 A1 * | 1/2012 | Cacka | A61C 17/02 | 433/82 |
| 2017/0224452 A1 * | 8/2017 | Chang | A61H 13/005 | |

FOREIGN PATENT DOCUMENTS

| | | |
|---|---|---|
| JP | 57-156759 A | 9/1982 |
| JP | S57156759 U | 10/1982 |
| JP | H11294608 A | 10/1999 |
| JP | 2007167088 A | 7/2007 |
| JP | 2018069072 A | 5/2018 |
| JP | 2020503149 A | 1/2020 |

OTHER PUBLICATIONS

1st Office Action dated Dec. 6, 2024 of Chinese Application No. 202111022029.6.

Xu Zheng et al., An Oral Treatment Device Integrating Periodontal Aspiration, Rinsing and Local Drug Delivery, published on Nov. 15, 2018.

James W. McKeage et al., Controllable Jet Injection of Dental Local Anaesthetic, IEEE Journal of Translational Engineering in Health and Medicine, published on Jun. 21, 2021.

* cited by examiner

ORAL IRRIGATOR HAVING WATER SPRAY SWITCHING FUNCTION

CROSS-REFERENCE TO RELATED APPLICATIONS

This application is based on and claims priority to the Chinese application No. 202110865618.4 filed on Jul. 29, 2021 and Chinese application No. 202111022029.6 filed on Sep. 1, 2021, the entire contents of which are incorporated herein by reference.

TECHNICAL FIELD

The present disclosure relates to personal care instruments, in particular to oral care instruments.

BACKGROUND

Brushing teeth is the conventional dental care behavior. However, it is difficult for most of toothbrushes to lead a toothpaste into gaps, grooves and cracks of occlusal surfaces, and thus it is necessary to clean teeth with an oral irrigator as an auxiliary appliance of the toothbrush. The oral irrigator generally includes a main body and a nozzle detachably connected with the main body. The main body of the oral irrigator includes a water pump that may suck cleaning liquid and spray the cleaning liquid through the nozzle at a certain pressure, to clean a place where the toothbrush is not easy to clean, such as a gap between teeth and gingival sulcus. Moreover, the oral irrigator may allow the cleaning liquid into the gap of the occlusal surface to neutralize acidic substances therein, and restore calcium content of the decalcified enamel.

At present, a spray effect of products on the market is relatively simple, and pulse water is generally used to wash the teeth at a high pressure. However, the existing pulse water has relatively great influence on some consumers, so that use benefit is affected. In addition, it is necessary to replace the corresponding nozzles of the existing oral irrigators in order to realize switching of various water sprays. However, too many nozzles of an oral irrigator bring problems for the user, for example, it is difficult to store excess nozzles, and the user will be confused to remember the various sprays corresponding to the different nozzles. As such, the user may only use one of the nozzles and waste the water spray switching function.

SUMMARY

The technical problem to be solved by the present disclosure is to provide an oral irrigator, which can realize water spray switching function without changing the nozzles.

In order to solve the above technical problems, the present disclosure provides an oral irrigator having water spray switching function, which includes a body, a nozzle and a path switching mechanism.

The nozzle is provided with a first path and a second path, and the path switching mechanism is configured to communicate one of the first path and the second path with an outlet end of a piston assembly inside the body of the oral irrigator, and disconnect the other one of the first path and the second path from the outlet end of the piston assembly.

The nozzle has a water outlet communicating with the first path and the second path. Water sprays from the water outlet are different when the first path or the second path is communicated with the outlet end of the piston assembly inside the body.

In a preferred embodiment, the path switching mechanism comprises an operating element and a sealing element linked with the operating element, the operating element is operated to drive the sealing element to communicate one of the first path and the second path with the outlet end of the piston assembly inside the body of the oral irrigator, and disconnect the other of the first path and the second path from the outlet end of the piston assembly.

In a preferred embodiment, the sealing element comprises a ball, a first spring and a mounting bracket; the mounting bracket is linked with the operating element; and the first spring has one end fixedly connected to the mounting bracket, and the other end pushing the ball against an inlet end of the first path or the second path.

In a preferred embodiment, a guide surface is arranged between the first path and the second path, and the guide surface presses the ball to compress the first spring when the ball is driven by the operating element to move from the first path to the second path or move from the second path to the first path.

In a preferred embodiment, the sealing element comprises a sealing gasket and a switching shaft linked with the operating element; and the operating element drives the switching shaft to move along an axial direction of the switching shaft, so that the sealing gasket seals the inlet end of the first path or the second path.

In a preferred embodiment, the operating element comprises a button and a second spring sleeved on the button, and the first path and the second path are sequentially arranged along a pressing direction of the button.

In a preferred embodiment, the nozzle comprises an outlet portion having a tapered shape, and the water outlet is arranged at an apex of the outlet portion.

In a preferred embodiment, an apex angle of the tapered shape is 30°-180°.

In a preferred embodiment, the apex angle of the cone is 35°-55°.

In a preferred embodiment, the first path communicates with the outlet portion along an eccentric direction.

In a preferred embodiment, the second path communicates with the outlet portion along a coaxial direction.

In a preferred embodiment, a pipe is arranged in the nozzle, and the first path and the second path are formed in the pipe and in a gap between an inner wall of the nozzle and the pipe, respectively.

Compared with the prior art, the technical solution of the present disclosure has following beneficial effects:

The present disclosure provides an oral irrigator having water spray switching function. A user may open one of the first path and the second path inside the nozzle and close the other of the first path and the second path through a path switching mechanism, which realizes different water sprays from the water outlet due to different water inlet modes to meet the user's different requirements. In addition, it is unnecessary to change the nozzles, and only operate the path switching mechanism to realize water spray switching function, which is convenient, quick and practical.

DETAILED DESCRIPTION

Figure 1:
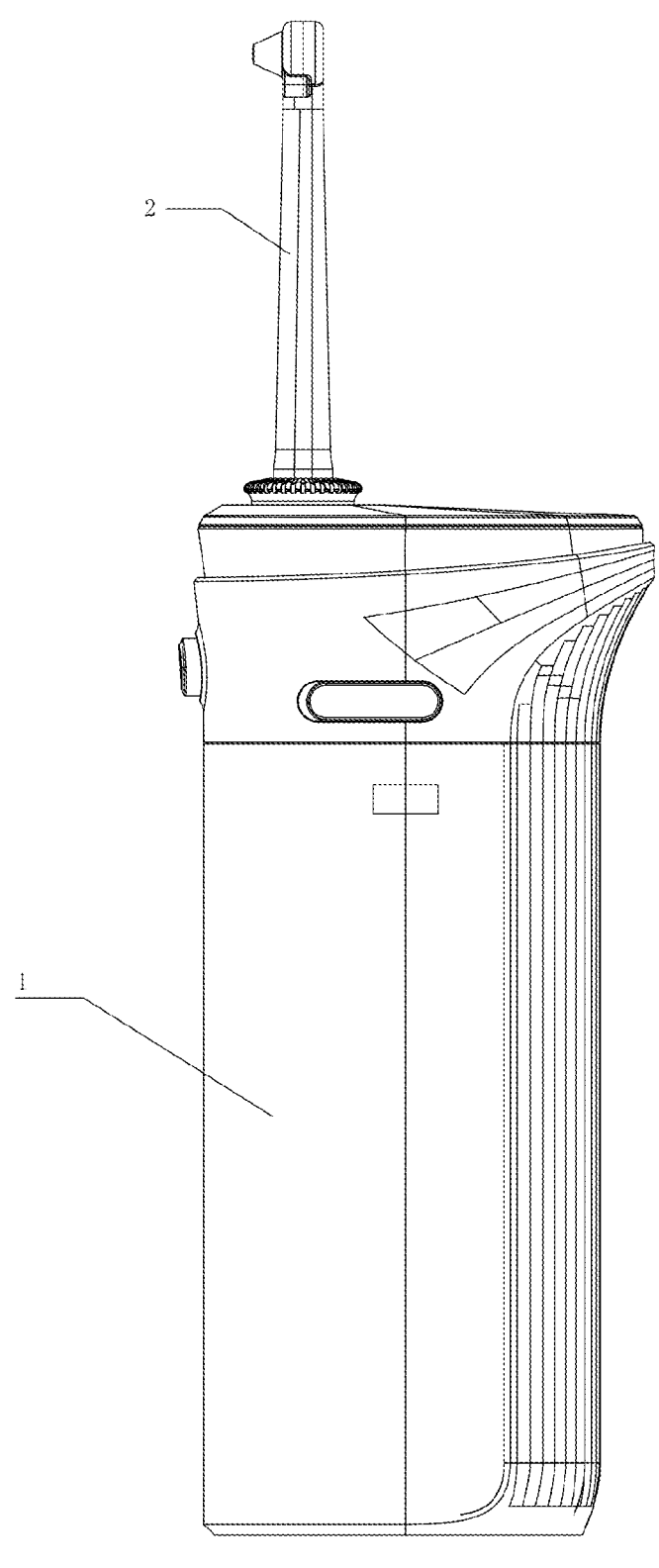
FIG. 1 is an appearance view of an oral irrigator according to a first preferred embodiment of the present disclosure.
Figure 2:
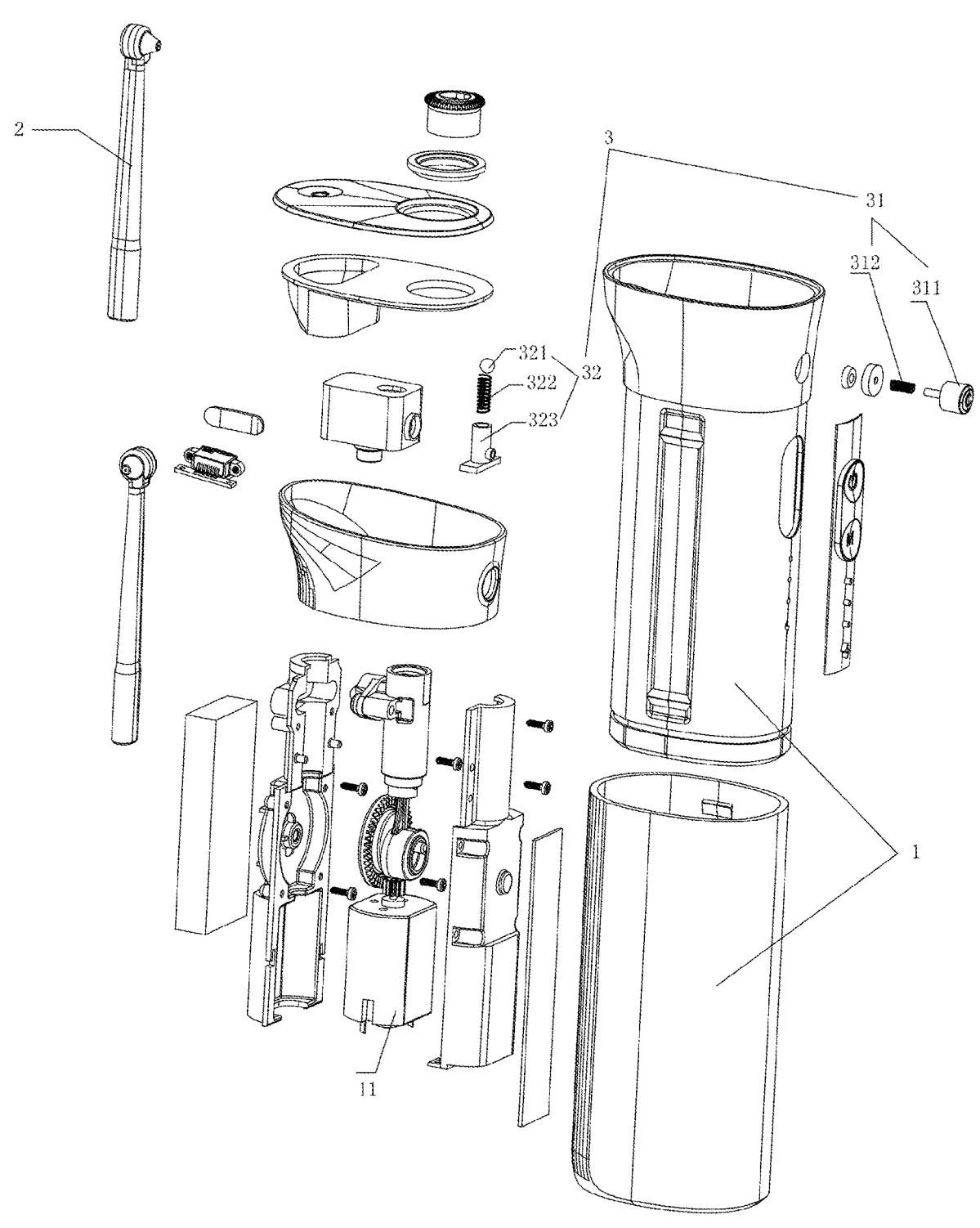
FIG. 2 is an exploded view of the oral irrigator according to the first preferred embodiment of the present disclosure.
Figure 3:
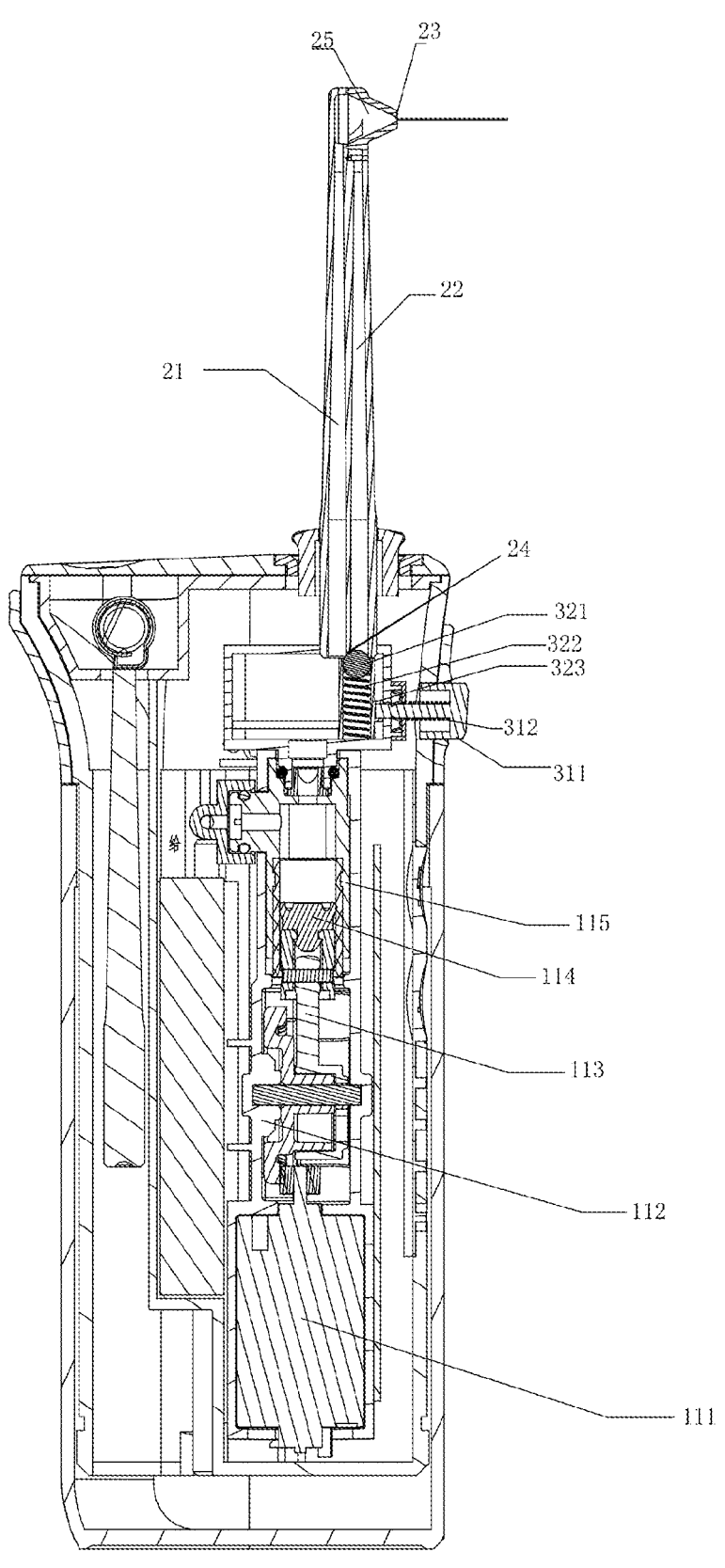
FIG. 3 is a cross-sectional view of the first preferred embodiment of the present disclosure when a first path of the oral irrigator is opened.
Figure 4:
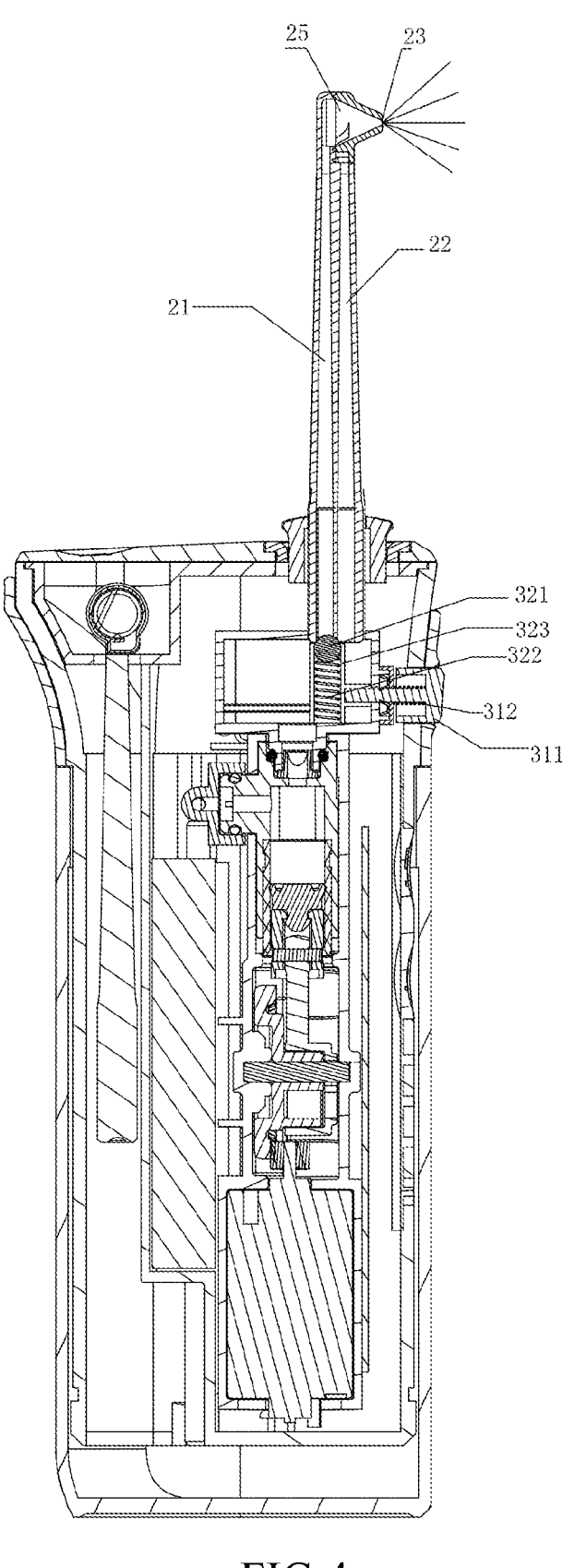
FIG. 4 is a cross-sectional view of the first preferred embodiment of the present disclosure when a second path of the oral irrigator is opened.
Figure 5:
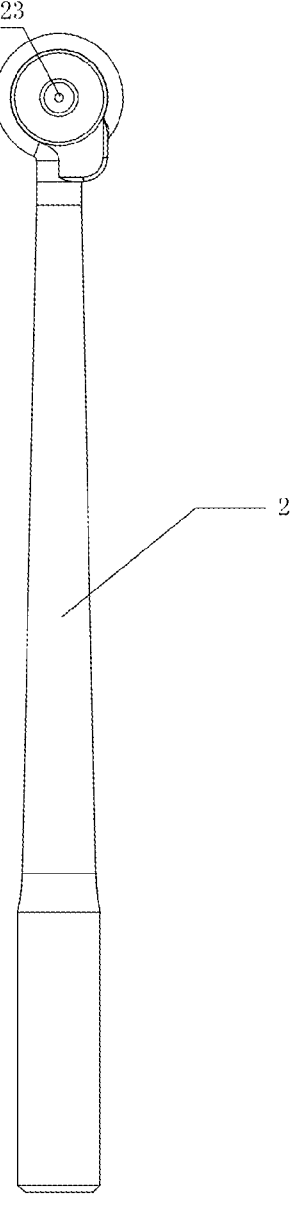
FIG. 5 is an appearance view of a nozzle according to the first preferred embodiment of the present disclosure.
Figure 6:
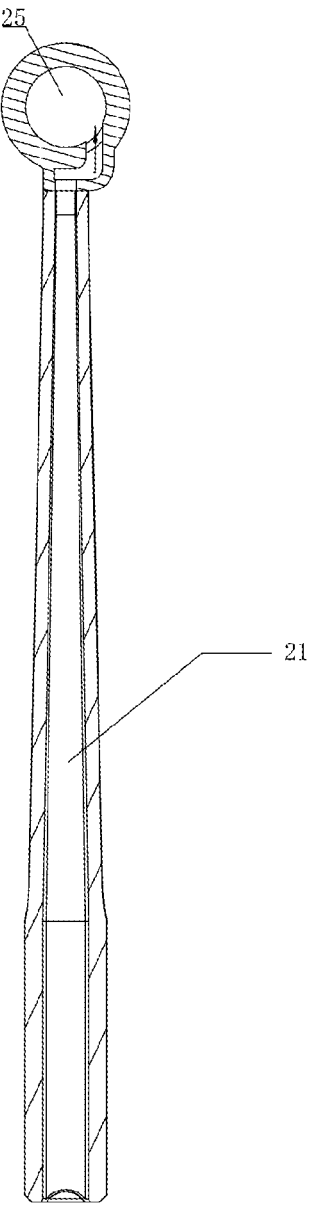
FIG. 6 is a cross-sectional view of the nozzle according to the first preferred embodiment of the present disclosure.
Figure 7:
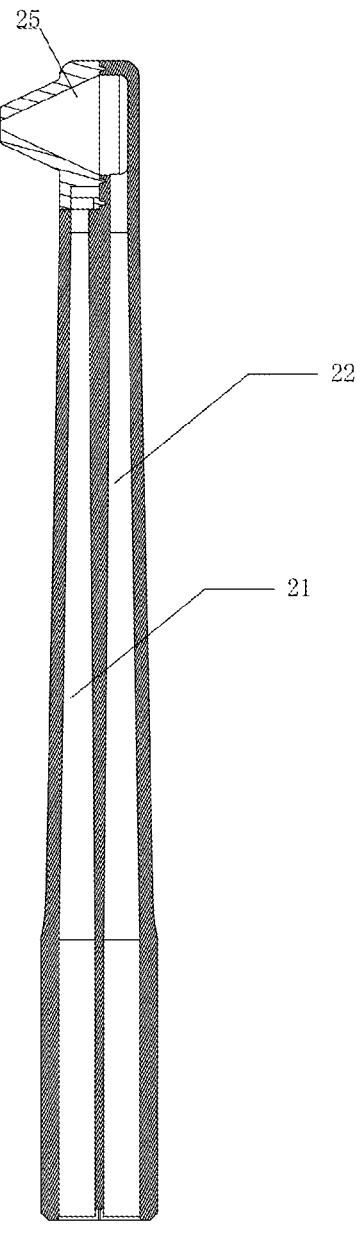
FIG. 7 is another cross-sectional view of the nozzle according to the first preferred embodiment of the present disclosure from another angle.
Figure 8:
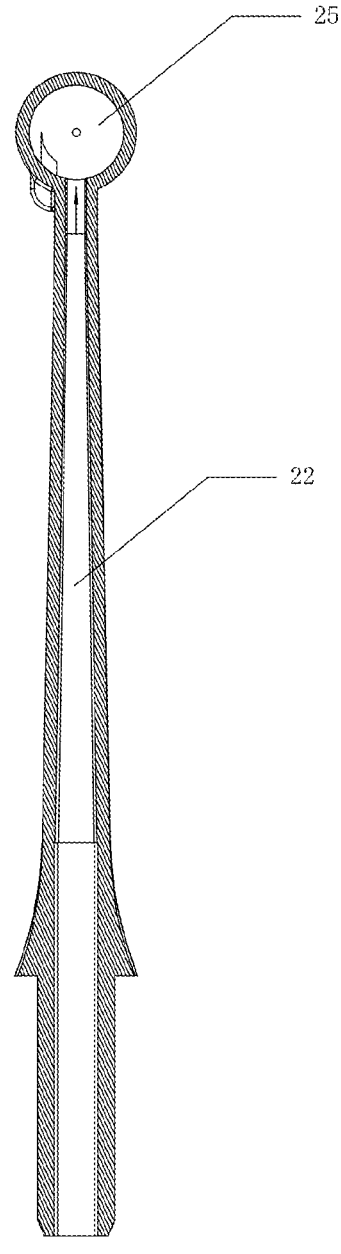
FIG. 8 is still another sectional view of the nozzle according to the first preferred embodiment of the present disclosure from still another angle.

The technical solutions in the embodiments of the present disclosure will be clearly and completely described below with reference to the accompanying drawings in the embodiments of the present invention; obviously, the described embodiments are only a part of the embodiments of the present disclosure, rather than all of the embodiments. The embodiments of the present disclosure, and all other embodiments that may be obtained by those ordinary skilled in the art without creative work, fall within the protection scope of the present disclosure.

In the description of the present disclosure, it should be noted that directions or positional relationships indicated by the terms "upper", "lower", "inner", "outer" and "top/ bottom" are based on the directions or positional relationships shown in the drawings, only to facilitate the description of the present disclosure and simplify the description, but not to indicate or imply that the referred devices or elements must have a specific orientation, be constructed and operated in a specific orientation, and thus cannot be understood to limit the present disclosure. In addition, the terms "first" and "second" are only used for descriptive purposes, and cannot be understood as indicating or imply-ing relative importance.

In the description of the present disclosure, it should be noted that, unless otherwise specified and limited, the terms "mounted", "provided", "sleeved/connected" and "con-nected" should be understood in a broad sense, for example, "connected" can be in a wall-mounted connection, a detach-able connection or an integrated connection, a mechanical connection, an electrical connection or the like.

First Embodiment

Referring to FIGS. 1-8, this embodiment provides an oral irrigator having water spray switching function, in which the oral irrigator includes a body 1, a nozzle 2 and a path switching mechanism 3.

The nozzle 2 is provided with a first path 21 and a second path 22, each of which has an inlet end. The path switching mechanism 3 is configured to communicate one of the first path 21 and the second path 22 with an outlet end of a piston assembly inside the body 1, and disconnect the other of the first path and the second path from the outlet end of the piston assembly 11. The first path 21 is opened when the first path 21 is communicated with the outlet end of the piston assembly 11; and the second path 22 is closed when the second path 22 is disconnected form the outlet end of the piston assembly 11. The first path 21 is closed when the first path 21 is disconnected from the outlet end of the piston assembly 11; and the second path 22 is opened when the second path 22 is communicated with the outlet end of the piston assembly 11.

The nozzle 2 has a water outlet 23 (such as a hole) communicating with the first path 21 and the second path 22. Water flows from the first path into the water outlet to form a first spray when the first path is opened; and water flows from the second path into the water outlet to form a second spray when the second path is opened, and the first water spray is different from the second spray. With the oral irrigator as mentioned above, the user may open one of the first path 21 and the second path 22 inside the nozzle 2 and close the other of the first path 21 and the second path 22 through the path switching mechanism 3, to realize different water sprays from the water outlet 23 due to different water inlet modes, so as to meet the user's various requirements. In addition, it is unnecessary to change the nozzle 2, and only operate the path switching mechanism 3 to realize water spray switching, which is convenient, quick and practical.

In this embodiment, in order to achieve an effect of water path switching, the path switching mechanism 3 includes an operating element 31 and a sealing element 32 linked with the operating element 31, and the operating element 31 is operated to drive the sealing element 32 to communicate one of the first path 21 and the second path 22 with the outlet end of the piston assembly 11 inside the body 1, and to discon-nect the other of the first path 21 and the second path 22 from the outlet end of the piston assembly 11. In this way, the path communicating with the outlet end of the piston assembly 11 is in an open state, and the other path disconnected from the outlet end of the piston assembly 11 is in a disconnected state.

In order to realize a sealing effect of the sealing element 32, the sealing element 32 includes a ball 321, a first spring 322 and a mounting bracket 323. The mounting bracket 323 is linked with the operating element 31. The first spring 322 has one end fixedly connected to the mounting bracket 323, and the other end pushing the ball 321 against an inlet end of the first path 21 or the second path 22.

In order to move the sealing element 32 from a position where the first path 21 is sealed to a position where the second path 22 is sealed, or move the sealing element 32 from the position where the second path 22 is sealed to the position where the first path 21 is sealed, a guide surface 24 is arranged between the first path 21 and the second path 22, and the ball 321 is driven by the operating element 31 to move from the first path 21 to the second path 22 or from the second path 22 to the first path 21. The guide surface 24 presses the ball 321 to compress the first spring 322. In this embodiment, the guide surface 24 is a guide slope.

In order to facilitate the user to operate the operating element 31, the operating element 31 includes a button 311 and a second spring 312 sleeved on the button 311, and an end of the button 311 is inserted and fixed on the mounting bracket 323. The first path 21 and the second path 22 are sequentially arranged along a pressing direction of the button 311. In this way, the user may switch the second path 22 by keeping the button 311 pressed to fix the ball 321 at the position where the first path 21 is sealed. At this time, the second spring 312 is pressed to accumulate an elastic restoring force. When the user releases the button 311, the button 311 will return to the position where the second path 22 is sealed under the elastic restoring force of the second spring 312.

In order to realize that the water spray from the water outlet 23 is different when the nozzle is opened in different paths, the nozzle 2 has an outlet portion 25 having a tapered shape and arranged at an apex of the outlet portion 25. The first path 21 communicates with the outlet portion 25 along an eccentric direction, and the second path 22 communicates with the outlet portion 25 along a coaxial direction.

In this way, when the first path 21 is opened, water directly flows into the outlet portion 25 from the front, to form a first spray (i.e., columnar water); and when the second path 22 is opened, water flows into the outlet portion 25 from the side and is rotated inside the outlet portion 25 to form a vortex, thereby realizing the water outlet effect of the rotated water and forming a second spray.

An apex angle of the tapered shape is 30°-180°, preferably 35°-55° in this embodiment.

In addition, in this embodiment, a nozzle accommodating cavity is provided inside the body 1, so that the user may place the nozzle 2 within the nozzle accommodating cavity when the oral irrigator is taken outside, to reduce a volume of the entire body 1, facilitate to be accommodated, and also prevent the nozzle 2 from being exposed and dirty.

In this embodiment, the piston assembly 11 includes a motor 111, an eccentric gear 112, a piston 113 and a piston seat 114. The motor 111 drives the rotation of the eccentric gear 112, and the eccentric gear 112 drives the piston 113 to reciprocate through a connecting rod 115. The piston 113 and the piston seat 114 form a closed space, and reciprocate to form two actions of water absorption and water discharge. The inlet end and outlet end are fixed by a check valve and a duckbill valve, so that a reciprocating motion of the piston 113 forms a pulse water flow.

Second Embodiment

Figure 9:
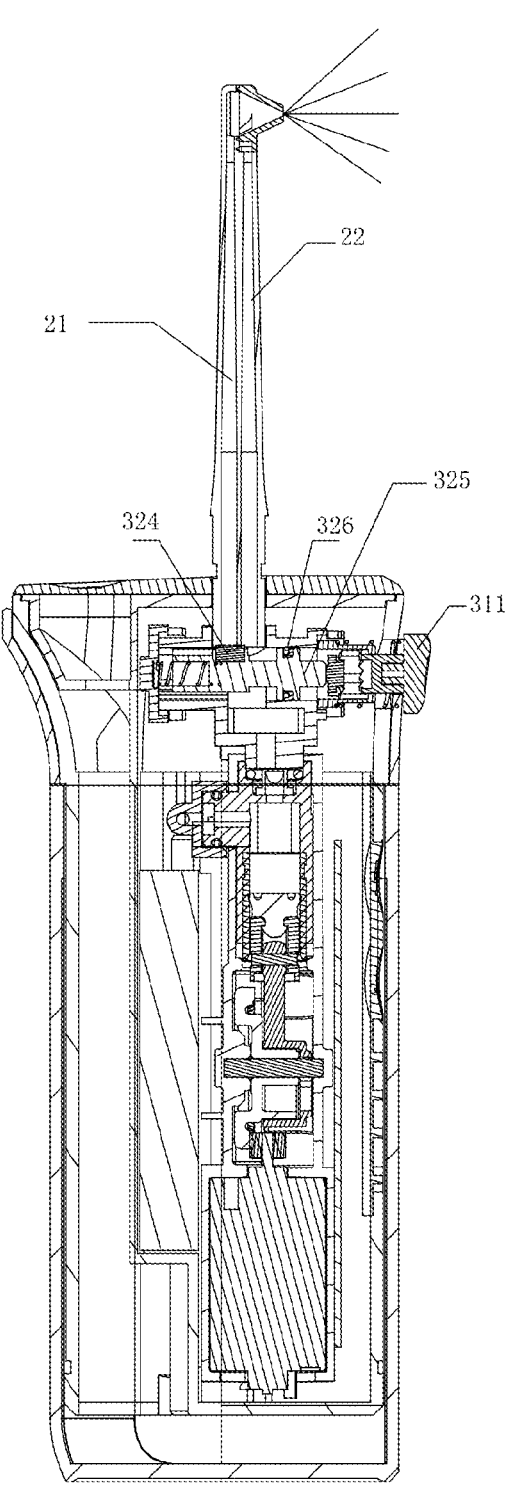
FIG. 9 is a cross-sectional view of a second preferred embodiment of the present disclosure when a first path of an oral irrigator is opened.
Figure 10:
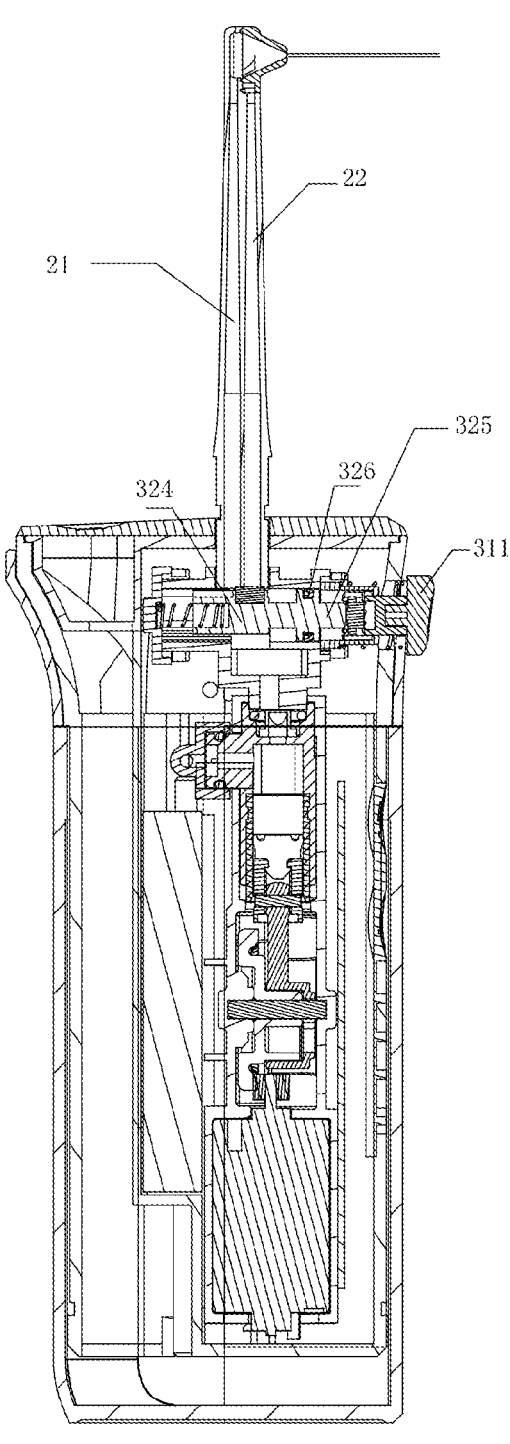
FIG. 10 is a cross-sectional view of the second preferred embodiment of the present disclosure when a second path of the oral irrigator.

Referring to FIGS. 9 and 10, this embodiment is different from the first embodiment in that the sealing element 32 in this embodiment includes a sealing gasket 324, a switching shaft 325 and a Y-shaped ring 326. The switching shaft 325 is linked with the button 311. The button 311 drives the switching shaft 325 to move along an axial direction of the switching shaft 325, so that the sealing gasket 324 seals an inlet end of the first path 21 or the second path 22. The Y-shaped ring 26 is arranged on the switching shaft 325 and located at a side of the switching shaft 325 close to the button 311, so as to prevent water from leaking from the switching shaft 325.

Third Embodiment

Figure 11:
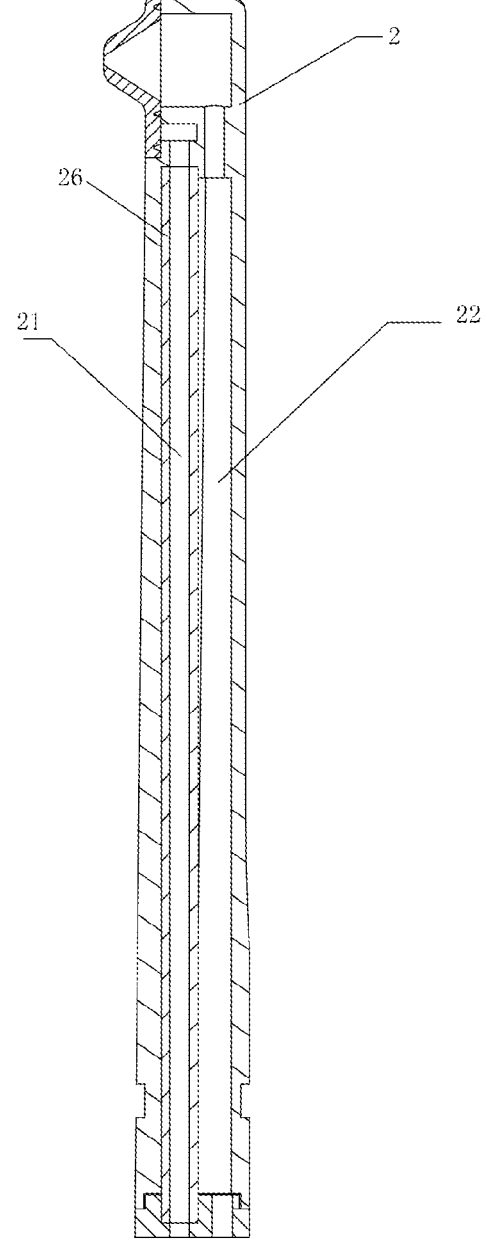
FIG. 11 is a cross-sectional view of a nozzle according to a third preferred embodiment of the present disclosure.

Referring to FIGS. 11, in this embodiment, in order to provide the first path 21 and the second path 22 inside the nozzle 2, a pipe 26 is provided in the nozzle, and the first path 21 and the second path 22 are formed in the pipe 26 and in a gap between an inner wall of the nozzle 2 and the pipe 26, respectively. The pipe 26 may be the first path 21 or the second path 22 according to its position in the nozzle 2. For example, if the pipe 26 is placed on a left side of the nozzle 2, the pipe 26 is the first path 21; conversely, the pipe 26 is the second path 22. In this embodiment, the pipe 26 is made of stainless steel.

The above are only the preferred embodiments of the present disclosure, but the design concept of the present disclosure is not limited to this. Any person familiar with the technical field who uses this concept to make insubstantial changes to the present disclosure within the technical scope disclosed by the present disclosure is an act violating the protection scope of the present disclosure.

What is claimed is:

1. An oral irrigator having water spray switching function, comprising:
   a body;
   a nozzle provided with a first path and a second path; and
   a path switching mechanism configured to open one of the first path and the second path, and close the other one of the first path and the second path;
   wherein the nozzle has a water outlet communicating with the first path and the second path; water flows out of the water outlet to form a first spray when the first path is opened; and water flows out of the water outlet to form a second spray when the second path is opened, and the first spray is different from the second spray,
   wherein the nozzle comprises an outlet portion having a tapered shape, and the water outlet is arranged at an apex of the outlet portion,
   wherein the first path communicates with the outlet portion along an eccentric direction,
   wherein the second path communicates with the outlet portion along a coaxial direction.

2. The oral irrigator having water spray switching function according to claim 1, wherein a piston assembly is provided inside the body of the oral irrigator and has an outlet end, and
   the path switching mechanism comprises an operating element and a sealing element linked with the operating element, the operating element is operated to drive the sealing element to communicate one of the first path and the second path with the outlet end of the piston assembly, and disconnect the other of the first path and the second path from the outlet end of the piston assembly.

3. The oral irrigator having water spray switching function according to claim 2, wherein the sealing element comprises a ball, a first spring and a mounting bracket;
   the mounting bracket is linked with the operating element;
   the first spring has one end fixedly connected to the mounting bracket, and the other end pushing the ball against an inlet end of the first path or the second path.

4. The oral irrigator having water spray switching function according to claim 3, wherein a guide surface is arranged between the first path and the second path, and the guide surface presses the ball to compress the first spring when the ball is driven by the operating element to move from the first path to the second path or move from the second path to the first path.

5. The oral irrigator having water spray switching function according to claim 2, wherein the sealing element comprises a sealing gasket and a switching shaft linked with the operating element;
   the operating element drives the switching shaft to move along an axial direction of the switching shaft, so that the sealing gasket seals the inlet end of the first path or the second path.

6. The oral irrigator having water spray switching function according to claim 2, wherein the operating element comprises a button and a second spring sleeved on the button, and the first path and the second path are sequentially arranged along a pressing direction of the button.

7. The oral irrigator having water spray switching function according to claim 1, wherein an apex angle of the tapered shape is 30°-180°.

8. The oral irrigator having water spray switching function according to claim 1, wherein a pipe is arranged in the nozzle, and the first path and the second path are formed in the pipe and in a gap between an inner wall of the nozzle and the pipe, respectively.

\* \* \* \* \*